United States Patent
Spartz

(10) Patent No.: US 9,839,872 B2
(45) Date of Patent: Dec. 12, 2017

(54) AMBIENT AIR PURIFIER WITH HUMIDIFICATION AND DEHUMIDIFICATION

(71) Applicant: MAX Analytical Technologies, Inc., East Windsor, CT (US)

(72) Inventor: Martin L. Spartz, Ellington, CT (US)

(73) Assignee: MAX Analytical Technologies, Inc., East Windsor, CT (US)

( * ) Notice: Subject to any disclaimer, the term of this patent is extended or adjusted under 35 U.S.C. 154(b) by 181 days.

(21) Appl. No.: 14/599,881

(22) Filed: Jan. 19, 2015

(65) Prior Publication Data

US 2015/0202563 A1    Jul. 23, 2015

Related U.S. Application Data

(60) Provisional application No. 61/929,227, filed on Jan. 20, 2014.

(51) Int. Cl.
*B01D 47/00* (2006.01)
*F24F 3/14* (2006.01)
(Continued)

(52) U.S. Cl.
CPC ......... *B01D 53/1487* (2013.01); *B01D 47/14* (2013.01); *B01D 53/1412* (2013.01);
(Continued)

(58) Field of Classification Search
CPC B01D 47/14; B01D 53/1412; B01D 53/1487; B01D 53/1493; B01D 2247/08; B01D 2247/107; B01D 2252/103; B01D 2252/60; F24F 3/14; F24F 3/1603; F24F 5/0042; F24F 6/12; F24F 2003/1617; F24F 2006/008
(Continued)

(56) References Cited

U.S. PATENT DOCUMENTS 4,473,380 A * 9/1984 Voliva .................... B01D 51/10
                                                        34/80
5,108,469 A * 4/1992 Christ .................... B01D 53/74
                                                        95/214
(Continued)

FOREIGN PATENT DOCUMENTS

| DE | 19516661 A1 | 11/1996 |
|---|---|---|
| WO | 01/72428 A1 | 10/2001 |
| WO | 2004/078322 A1 | 9/2004 |
| WO | 2013/098783 A2 | 7/2013 |

OTHER PUBLICATIONS

International Preliminary Report on Patentability, dated Jul. 26, 2016, from counterpart International Application No. PCT/US2015/011918, filed on Jan. 19, 2015. Eight pages.
(Continued)

*Primary Examiner* — Frank Lawrence
(74) *Attorney, Agent, or Firm* — HoustonHogle LLP

(57) ABSTRACT

Indoor air is purified using a purifying solution in an arrangement capable of removing formaldehyde and other pollutants, such as, for example, particulates. The arrangement can prevent re-vaporization of volatile compounds and can generate air that has been humidified or dehumidified. In one approach, incoming air is contacted with the purifying solution in a packed bed.

22 Claims, 2 Drawing Sheets

(51) Int. Cl.
*B01D 53/14* (2006.01)
*B01D 47/14* (2006.01)
*F24F 3/16* (2006.01)
*F24F 5/00* (2006.01)
*F24F 6/12* (2006.01)
*F24F 6/00* (2006.01)

(52) U.S. Cl.
CPC ............ *B01D 53/1493* (2013.01); *F24F 3/14* (2013.01); *F24F 3/1603* (2013.01); *F24F 5/0042* (2013.01); *F24F 6/12* (2013.01); *B01D 2247/08* (2013.01); *B01D 2247/107* (2013.01); *B01D 2252/103* (2013.01); *B01D 2252/60* (2013.01); *F24F 2003/1617* (2013.01); *F24F 2006/008* (2013.01)

(58) Field of Classification Search
USPC ..... 95/149, 211, 214, 228, 229; 62/617, 640
See application file for complete search history.

(56) References Cited

U.S. PATENT DOCUMENTS

| | | |
|---|---|---|
| 5,578,113 A | 11/1996 | Glenn |
| 6,551,382 B1 * | 4/2003 | Richards ................ B01D 47/06 95/199 |
| 2008/0017033 A1 * | 1/2008 | Charrue ................. B01D 47/06 95/228 |
| 2008/0127820 A1 | 6/2008 | Park et al. |
| 2008/0289501 A1 * | 11/2008 | Kapitoures ............ B01D 47/14 95/211 |

OTHER PUBLICATIONS

International Search Report and Written Opinion of the International Searching Authority, dated Mar. 25, 2015, from counterpart International Application No. PCT/US2015/011918, filed on Jan. 19, 2015.

* cited by examiner

AMBIENT AIR PURIFIER WITH HUMIDIFICATION AND DEHUMIDIFICATION

RELATED APPLICATIONS

This application claims the benefit under 35 USC 119(e) of U.S. Provisional Application No. 61/929,227, filed on Jan. 20, 2014 which is incorporated herein by reference in its entirety.

BACKGROUND OF THE INVENTION

In the industrial setting, exhaust gases are purified using adsorbents, scrubbers or other processes, as known in the art. In one approach, a stream of spent process gas is passed through a purification station that includes a scrubbing solution to generate gas that can be released to the atmosphere, e.g., in compliance with the provisions of the Clean Air Act or other requirements. In living spaces, solution trapping of dust and debris from floors, carpeting or upholstery has been carried out with vacuum cleaners designed to utilize a water reservoir.

Current techniques for reducing airborne particulates in indoors environments (residential, commercial, working quarters and so forth) typically employ HEPA (High-Efficiency Particulate Air) or other filtering arrangements that use the weave of a material to collect dust and other particulates, with the purifying device being replaced at specified intervals. Reduction of airborne chemicals is conventionally addressed by utilizing carbon-based or molecular sieve-based materials to adsorb or chemisorb harmful vapors or gases from the ambient air. These filters are then replaced on a prescribed basis.

Existing purification systems for indoors air, however, have limited trapping capability and/or efficiency for airborne contaminants such as some volatile chemicals, in particular formaldehyde, harmful gases, and/or for the removal of acids or bases from air. In addition, many existing purification systems require very high flow rates to be even partly successful. Cumbersome cleaning requirements and/or frequent and costly filter cartridge replacements are other disadvantages associated with conventional indoor air purifiers.

SUMMARY OF THE INVENTION

A need exists, therefore, for techniques and equipment designed to remove harmful airborne substances such as volatile chemicals, gases and/or particulates from indoor air. Also needed is the production of purified air that is humidified or dehumidified, as desired or needed.

Generally, the invention relates to the use of a liquid medium (typically a purifying solution) that retains one and preferably more than one type of pollutant present in a stream of indoor air.

In one aspect, a method for purifying indoor air comprises: contacting an incoming air stream from an indoor environment with a purifying solution (also referred to herein as a "cleaning" solution) to retain one or more gaseous, vapor or particulate pollutants in the purifying solution and produce an outgoing air stream; and cooling or maintaining the incoming air stream from the indoor environment, the purifying solution, the outgoing air stream or any combination thereof to or at a temperature at which the vapor pollutants are in a liquid phase. Optionally, the outgoing air stream can be directed to a filter for removing particulates. A purified air exhaust that can be dehumidified or humidified is released to the indoor environment. For example, water vapors can be provided to the purified air exhaust before or as it is released into the indoor environment. Contact between the incoming air stream and the purifying solution can be obtained by directing the incoming air stream through the purifying solution held in a purifying solution reservoir. In some embodiments, contact between the incoming air stream and the purifying solution takes place in a packed bed.

In another aspect, a system for purifying indoor air includes a purifying solution; at least one device for cooling or maintaining one or more of an incoming air stream, an outgoing air stream or the purifying solution to or at a temperature at which vapor pollutants are in a liquid phase; an optional filter for removing particulates entrained in the outgoing air stream; and an apparatus for adding water vapors to produce a purified air exhaust that is humidified.

In a further aspect, a system for purifying indoor air includes a packed column for contacting an incoming air stream with a purifying solution to produce an outgoing air stream; at least one device for cooling or maintaining one or more of an incoming air stream, an outgoing air stream or the purifying solution to or at a temperature at which vapor pollutants are in a liquid phase; an optional filter for removing particulates entrained in the outgoing air stream; and one or more devices for adding water vapors to the outgoing air stream to produce a purified air exhaust that is humidified.

Practicing the invention can have many advantages. Some of its embodiments, for example, yield a simple indoor air purifier that can be run on a continuous basis, using water or a solution in conjunction with a condenser. The system described herein is a simple, stand-alone unit capable of removing formaldehyde and/or other air pollutants more effectively than current carbon or other solid extraction materials. The system can prevent re-vaporization of volatile compounds and can generate not only cleaner air but also air that is dehumidified or humidified, e.g., as needed or desired. In addition, filter cartridges for particles removal and/or their replacement can be eliminated or reduced. Even with designs that incorporate solid adsorbents, cartridge replacement is expected to occur less frequently compared with replacement and/or cleaning requirements encountered with existing HEPA-, carbon- or molecular sieves-based air purifier. Tip-over, humidity, temperature or solution level sensors, flow rate controls, air and/or solution characteristics sensors, and other optical, electrochemical or electronic devices can be included to address safety and/or convenience issues. Importantly, using the apparatus and techniques described herein can decrease or minimize the need to open windows or doors for aeration, saving energy. Embodiments that utilize a packed column can offer esthetic effects and/or enhancements to the purification process.

The above and other features of the invention including various details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
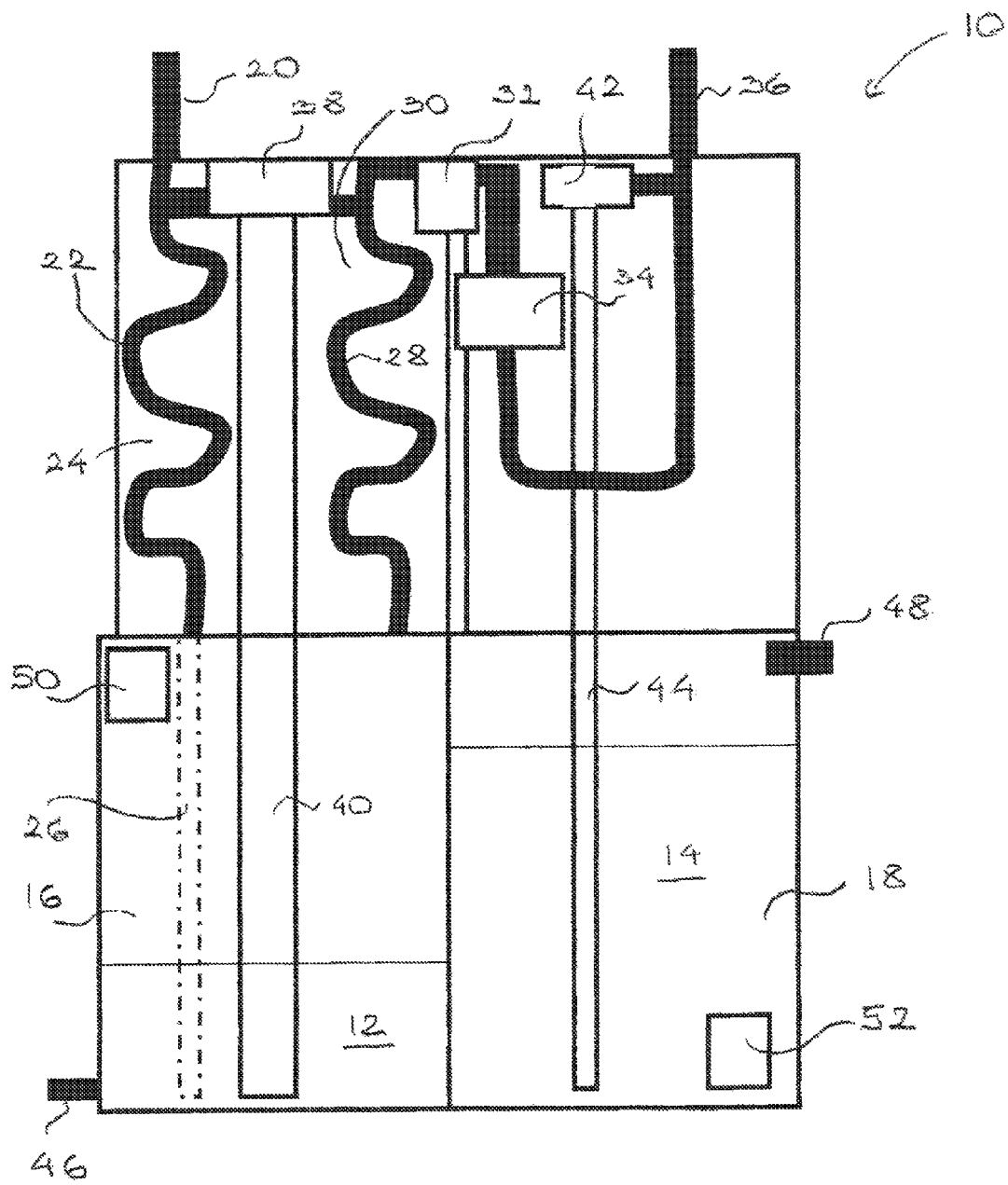
FIG. 1 is a schematic diagram of a system according to one embodiment of the invention.

The invention generally relates to the purification of indoor air such as found in the residential, office, school, daycare, medical, commercial or industrial setting, in trains, buses, automobiles, planes or other enclosed spaces. The system can be scaled up or miniaturized to accommodate the factory floor or a small room. More than one system can be utilized to service larger indoor environments. Aspects of the system and methods described herein address the removal of a wide spectrum of pollutants, including harmful vapors, gases, particulates and other contaminants from the indoor environment.

Volatile organic compounds, including semi-volatiles, and generally referred to herein as "VOCs", for example, are some of the most common air pollutants. Indoors, VOCs derive from paints, solvents, flame retardants, wood preservatives, glues found in wood composite building materials, aerosol sprays, cleansers, disinfectants, moth balls, insecticides, fungicides, herbicides, plasticizers, new carpeting, upholstery or furniture, air fresheners, stored fuels, automotive products, hobby supplies, dry-cleaned clothing and so forth, or from underlying contaminated soil or groundwater. In most cases, levels of at least some VOCs are found to be higher indoors than outdoors.

Chemically, VOCs encompass hydrocarbons, alcohols, ketones, aldehydes, and other types of compounds. Specific examples of VOCs that can be encountered indoors include but are not limited to ethanol, methyl ethyl ketone, chloroform, formaldehyde, trichloroethene, tetrachloroethene, methyl tert butyl ether (MTBE), hexane, benzene, toluene, ethyl-benzene, trimethyl-benzene, xylenes, naphthalene, polyaromatics and others.

Indoor air also can contain harmful gases such as ammonia ($NH_3$), a base, ozone, known as a respiratory irritant, acid gases such as acetic acid, oxides of nitrogen, generally referred to as $NO_x$, and in particular $NO_2$ (considered an asthma trigger), oxides of sulfur ($SO_x$), carbon oxides (CO and $CO_2$) and others.

In specific aspects, airborne particulates, such as dust, dander, fibers, mites, pollen, mold spores, other allergens, microbes, and the like also can be trapped.

Generally, these and other pollutants (also referred to herein as contaminants) are collected from the indoor air using a liquid medium formulated to remove chemical compounds and/or airborne particulates. The liquid medium can be a solution, also referred to herein as a "purifying solution". Colloidal suspensions, dispersions, emulsions, other multi-(meaning two or more) phase systems and the like also can be employed; for convenience, these too are referred to herein as "solutions".

We have discovered that water itself can be an effective absorber for a polar VOC such as formaldehyde. Thus in many cases, the purifying solution consists of, consists essentially of, or comprises water. Non-aqueous solutions, e.g., formed using an organic solvent, also can be used.

The cleaning solution can contain one or more ingredients or "additives" capable of binding to, trapping or otherwise separating air contaminants from air by chemical and/or physical mechanisms. Examples of additives that can be utilized include but are not limited to complexing agents (for trapping some VOCs, for instance, formaldehyde), antimicrobials (e.g., containing silver), surfactants, soaps, micelle-type components (e.g., to trap non-polar compounds), oxidizers (e.g., peroxides, perchlorates, permanganates, ozone, etc.), chemicals reactive towards specific contaminants, and/or other materials. Additives that can remove VOCs biologically, e.g., by aerobic biodegradation, also can be employed. For trapping a wide spectrum of pollutants, the solution may include more than one type of additive. Other ingredients, fragrances, for examples, also can be included.

The nature and/or level of additives being included can be adjusted based on the type of contaminants expected in a given setting, season, the presence or absence of pets, or other factors. Optimal proportions can be determined through routine experimentation, calculations, modeling or other techniques known in the art. Additives can be premixed to form the solution or combined with water or solution at the point of use. In the latter case, the additives can be provided in pouches, vials, envelopes, as kits or by other means. In some implementations, the purifying solution is water and one or more additives is/are provided in a separate (auxiliary) solution (the term embracing true solutions as well as multi-phase systems such as emulsions, dispersions, colloidal suspensions, and the like).

In a typical arrangement the purifying solution is contained in a chamber or reservoir. Incoming air is directed through the solution, contaminants are retained in the solution, generating an outgoing air stream having lower pollutant levels. Some aspects provide for humidifying or dehumidifying the air that is released back to the ambient environment, e.g., for improved comfort. Other aspects provide additional steps and/or elements that help reduce or minimize entrainment of pollutants (e.g., volatilized substances or particulates) in the outgoing air stream that leaves the purifying solution.

More than one reservoir can be employed, with partially purified air passing from a first to a subsequent reservoir, e.g., for further purification or for adding or removing moisture. In some aspects, all reservoirs contain the same solution. In others, the reservoirs contain different solutions, e.g., for trapping different types of contaminants. In specific implementations, the first reservoir consists of, consists essentially of or comprises water (often a water-based purifying solution) and a second or subsequent reservoir consists of, consists essentially of or comprises water for adding moisture to the outgoing air. The water in this second or subsequent reservoir (holding the humidifying solution for adding moisture to outgoing air) can contain or receive additives, e.g., antimicrobials, other agents for removing biologicals, or other additives such as described above. In addition or alternatively, additives can be supplied from one or more auxiliary reservoirs holding, for instance, one or more auxiliary solution(s). In specific implementations, the system described herein includes a reservoir containing the purifying solution, a reservoir containing the humidifying solution and, optionally, one or more auxiliary reservoir(s), typically used to supply additives to the purifying and/or humidifying solution(s) or chamber(s), for solution replenishing purposes, or for other needs.

Air is pushed through the system using fans, pumps, compressors, injectors, spargers, educators, any combinations thereof and/or other suitable devices.

Flow rates can be determined by considering air requirements, volume of air to be purified, efficiency of the system, air-solution contact time, and other factors. In some implementations, the flow rate is adjustable. In others, the flow rate is varied automatically by sensors and/or controls. Typically, the process is a continuous or semi-continuous type process (as opposed to a batch approach). In specific embodiments the flow rate of the incoming air is the same as that at which decontaminated air is released back into the ambient indoor environment.

Spent solution can be discarded and replaced as needed. Some embodiments provide for an integrated auxiliary reservoir containing clean solution that can be added to the reservoir (e.g., by opening a valve) automatically, for instance in response to a sensor reading a low solution level in the primary reservoir, or manually.

One important property of VOCs is that they evaporate easily at room temperatures and ambient pressure. Due to their "volatility", VOCs retained in the purifying solution can potentially re-vaporize and become entrained in the outgoing air, re-contaminating it. This problem can be addressed through various approaches.

In one embodiment, the solution is kept at a temperature low enough to ensure that at least the bulk of VOCs absorbed in the purifying solution remains in the liquid phase. In illustrative examples, a water-based purifying solution is cooled/maintained at a temperature below room temperature, e.g., below 25 or 20° C., for instance within the range of from about 20 to slightly above 0° C., e.g., 1, 2, 3, 4 or 5° C. Lowering the solution temperature can be achieved by cooling the incoming polluted air, the outgoing (exhaust) air, the solution reservoir or a combination thereof. Any suitable technique can be used, as known in the art. In specific examples, the desired low temperature is achieved without refrigerants (e.g., fluorocarbons or chlorofluorocarbons) by thermoelectric (also known as Peltier) cooling (the principle of which relies on heat transfer from one side of a solid state device to the other, with consumption of electrical energy).

Other techniques for addressing the problem of vapors of VOCs entrained in the outgoing (exhaust) air rely on condensing these vapors before they are released back into the environment (along with the outgoing air). For instance, outgoing air can be contacted with cooling plates or other means for effecting vapor condensation.

A combination of solution cooling (to prevent formation of VOC vapors in the first place) and condensation techniques (for removing VOC vapors, if formed, from the outgoing air, before its release to the indoor environment) also can be employed. Solution cooling and/or use of condensation techniques also can reduce or minimize evaporation of some solvents, e.g., water present in the cleaning solution, and/or other solution components being employed.

To address the possible entrainment of particulates, outgoing air can be passed though one or more filters. Examples include, but are not limited to fiber-based filters such as HEPA filters (typically made of an entanglement of thin fibers that usually are less than one micron in diameter). Filters containing carbon, molecular sieves, e.g., zeolites, clays, or other adsorbers or chemisorbers that can trap materials, e.g., biologicals, entrained in the outgoing air also can be utilized, as can other kinds of filters (e.g., electrostatic filters) or combinations of filters.

If used, these filters can be cleaned (e.g., through washing or desorption) and/or replaced periodically. Due to the reduced levels of particulates in the outgoing air (the bulk having already been trapped in the purifying solution), cartridge replacement requirements are expected to be relatively low. The filter can be omitted or bypassed, for instance in situations in which particulate levels are low, particulates are efficiently trapped in the purifying solution, entrainment is not a problem, and so forth.

In many embodiments, solution cooling and/or use of condensation techniques can be relied upon to reduce or minimize entrainment of water vapors in the outgoing air stream, generating purified air that is dehumidified. Additionally or alternatively, entrained water vapors can be removed by passing outgoing air through desiccants, sorbents, (additional) condensers and/or other suitable materials or devices. In situations that employ a filter for trapping particulates that is prone to clogging or deterioration by contact with water, entrained water vapors preferably are removed prior to (upstream of) the filter.

In specific implementations water vapors are added to the outgoing air stream (e.g., as needed, desired, to replenish condensed water vapors retained in the purification solution, or for other reasons) before or as it exits the system to produce a purified air exhaust that is humidified. Humidification can be conducted using an apparatus containing a humidifying solution (typically water-based) and a vaporizer configured to release water vapors in the outgoing air stream. Water vapors also can be entrained by passing the outgoing air stream through a suitable medium saturated with water or by another technique suitable for humidifying air, as known in the art. If a filter for removing particulates is employed, water vapors preferably are added after (downstream from) the filter, thus preventing or reducing clogging problems or sorption of the added water vapors by the filter material.

The outgoing air stream can be humidified for any length of time, for example, throughout all or one or more interval(s) of the purification process. The operation can be controlled manually (e.g., according to personal preferences) or through automated sensors and/or controls and can run continuously, intermittently, or not at all. In humid weather, for example, it may be desirable to release dry or dehumidified air and thus adding water vapors to the outgoing air stream can be omitted. On the other hand, releasing to a dry indoor environment a purified exhaust air that has been humidified can increase breathing comfort, alleviate dry skin problems and so forth.

The quality of the solution can be monitored. Ion loading, pH, chemical composition, depletion levels and other characteristics of the solution can be determined using electrochemical sensors, optical (visible or IR) sensors, scattering techniques, and so forth. Sensors also can be utilized to measure and/or control operating parameters such as flow rates, air properties, e.g., temperature, contaminant and/or humidity levels, or other characteristics of the incoming or outgoing air.

The air purification approaches described herein can be carried out in conjunction with monitoring the air quality of the indoor environment. Pollutants and/or humidity levels in the ambient environment can be determined using techniques and/or equipment known in the art. For example, the quality of ambient air can be tested using commercially available technology, such as, for instance, available from Prism Analytical Technologies, Mt. Pleasant, Mich. Data obtained can be used to cease or commence the purification process or to adjust operation parameters. Humidity levels in the indoor environment can be used to determine whether or not water vapors are to be added to the outgoing air stream.

Electrical wiring and connections are provided for plugging the system to a power source, e.g., via 110 VAC plug.

The system or parts thereof can be enclosed in a housing. The housing, solution reservoir(s), conduits, and/or other system components are constructed from any suitable material. Many plastics or composites, for example, can provide strength, while being relatively lightweight. Some implementations utilize materials that have antimicrobial properties. In one example, at least one component of the system, e.g., the housing or one or more solution reservoir(s), is fabricated from a plastic or a composite material that contains silver nanoparticles. In another example, antimicrobial coatings can be used on one or more internal surfaces.

If a housing is included, the overall design can be configured to allow removal (e.g., for cleaning) and re-insertion of the one or more reservoirs present. Access to other components of the system also can be provided.

Tip-over sensors and/or controls can shut-down the system if toppled. Some embodiments provide electronics, software and interfaces for the programmable or remote operation of the entire system or components thereof. System diagnostics can inform of solution status, purity of air released from the system, flow rates, temperatures and/or other parameters. The purification system described herein can be integrated with heating, lighting, air conditioning or other systems and can be computer monitored and/or controlled.

As an illustrative example, shown in the FIG. 1 is system 10 including purifying solution 12, such as described above, and humidifying solution 14. One or both solutions can contain antimicrobial or other additives. These solutions are held, respectively, in reservoirs (also referred to as chambers) 16 and 18. For instance, solution 12 and/or solution 14 are present, respectively, in the lower region of chambers 16 and/or 18. In some implementations, reservoirs 16 and/or 18 are reusable, with spent solutions 12 and/or 14 being discharged and replaced or replenished as needed. In other implementations, reservoirs 12 and/or 14 are disposable. In further implementations, replacement reservoirs, optionally including a purifying or humidifying solution can be provided as a kit. In yet other implementations, a kit includes one or more reservoirs, containing additives such as described above, with solvent (typically water) being added at the point and/or time of use.

Incoming air is introduced into the system at inlet 20 and proceeds through condensing coil 22, cooled, e.g., by a Peltier device such as Peltier cooling jacket 24, towards purifying solution 12. Optional bubbler or sparger 26 can be utilized to improve mixing of the incoming air with the purifying solution. The bubbler can be an impinger of a design similar to that utilized in air testing techniques. A suitable impinger is described in applicable EPA method(s).

Outgoing air flows from purifying solution 12 through outlet condensing coil 28, cooled, e.g., by a Peltier device such as Peltier cooling jacket 30. The inlet and outlet condensing coils operate in a manner similar to a dehumidifier and help maintain volatiles in their liquid form, thus preventing their return to the indoor environment as vapors entrained in the outgoing air. In some embodiments, only the incoming or only the outgoing air is cooled. In these cases one of the condensing coil and its corresponding Peltier jacket can be omitted. In other embodiments, it is reservoir 16 that is cooled, either in conjunction with or as an alternative to cooling the incoming and/or outgoing air.

The temperatures selected are those suitable for preventing re-vaporization of formaldehyde (or other VOCs).

In one implementation, condenser 28 is configured or operated to prevent water vapors from being entrained in outgoing air. This may be particularly helpful when the air released back to the ambient environment is being dehumidified.

From condenser coil 28, outgoing air passes through a filter, e.g., HEPA filter 32 to remove any entrained particulates and generate a purified air exhaust. The air is pushed through, using, for instance, variable air pump 34 and is exits the system (being released into the ambient indoor environment) through outlet 36.

Suitable flow rates can be determined experimentally.

Intermittent liquid (water) pump 38 is in fluid communication with inlet and outlet condenser coils 22 and 28 and is connected to draw tube 40, a conduit that extends into purifying solution 12.

Optionally, system 10 can be provided with a vaporizer, e.g., controlled vaporizer 42. If used, some of the humidifying (aqueous) solution can be lifted through draw tube 44 and vaporized in the vaporizer. Water vapor is released to the purified stream generated from filter 32 to produce purified air exhaust that is humidified. For dehumidification, water vapor contained in the outgoing stream (before it reaches the filter) and/or in the purified air exhaust generated from the filter is condensed and returned to the purifying or the humidifying solution.

Liquid inlets and outlets are provided for draining and/or replenishing the reservoirs. For example, purifying solution 12 can be evacuated, partially or entirely, using drain tube 46. Filling tube 48 can be utilized to fill reservoir 18. Other openings can be included for adding to or withdrawing contents of the reservoir(s), e.g., solvents, additives and so forth. In specific implementations, one or more auxiliary reservoirs, e.g., for holding fresh solution(s) or auxiliary solution(s) supplying additives are incorporated in the system design.

System 10 can be provided with various sensors, such as, for example, purifying solution sensor 50 and/or humidifying solution sensor 52. These and other sensors (not explicitly shown in the Figure) can provide information about solution properties, e.g., temperature, chemical composition, pH, ion characteristics, about solution levels in the reservoir(s) and so forth. Such sensors can signal the need for removing spent solution from a reservoir, adding solvents or additives, raising or lowering temperatures and so forth. Sensors also can be utilized to monitor incoming and outgoing air for characteristics such as temperature, humidity levels, flow rates, purity and/or other parameters. In many embodiments, the sensors are tied in to controls, interfaces, software, etc. that automate the operation of the system or integrate it with other systems.

Figure 2:
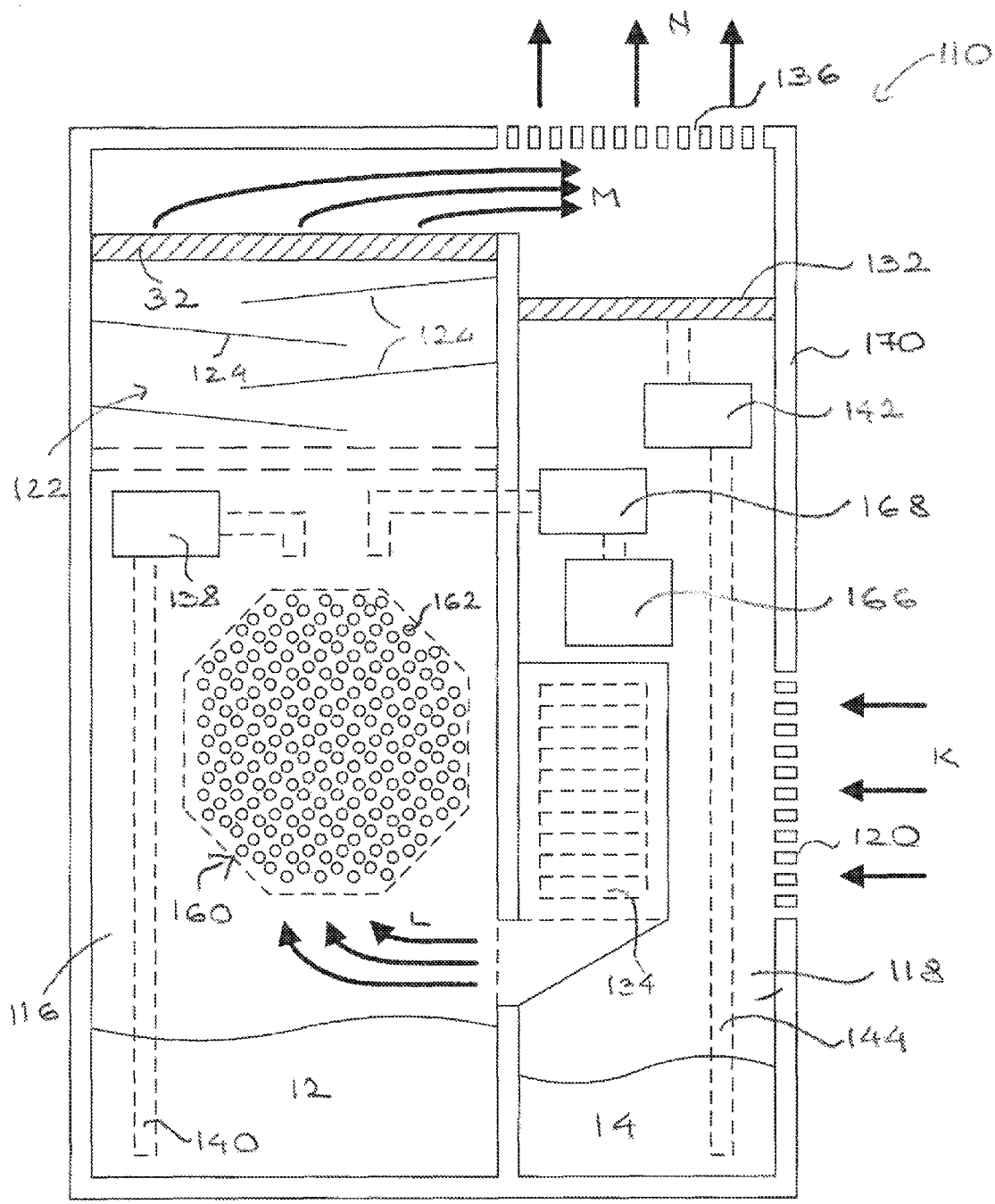
FIG. 2 is a schematic diagram of a system according to another embodiment of the invention.

As another illustrative example, shown in FIG. 2 is system 110, containing purifying solution 12 and humidifying solution 14, held, respectively, in reservoirs (chambers) 116 and 118, e.g., in the lower regions of the reservoirs. One or both solutions can contain additives such as described above. In one implementation, one or both reservoirs are reusable, with spent solutions 12 and/or 14 being discharged and replaced or replenished as needed, manually or in automated fashion. Drain and/or filling tubes (not shown in FIG. 2) can be provided, e.g., as described with reference to the apparatus of FIG. 1. In other implementations, reservoirs 116 and/or 118, optionally including purifying and/or humidifying solutions, are disposable. In further implementations, replacement reservoirs, optionally including purifying and/or humidifying solutions, can be provided as a kit. In yet other implementations, a kit includes one or more reservoirs, containing additives such as described above, with solvent (typically water) being added at the point and/or time of use.

Air from the indoors environment enters the system at inlet 120 (arrows K) and is directed to reservoir 116 via device 134, for example, a squirrel cage fan or blower. A pump or another suitable apparatus also can be used.

Contact between incoming air and the purifying solution occurs in packed bed 160 (also referred to herein as packed column 160). In many implementations, air and purifying solution pass through the packed bed in a countercurrent flow pattern. As shown in FIG. 2, for example, purifying solution is lifted though draw tube 140 using pump 138, and is directed to the top of packed bed 160, from where it progresses downwardly through the packed bed, descending to the bottom of reservoir 116. Moving in the direction of arrows L, the air stream enters the bottom of column 160 and proceeds upwardly through the column. Co-current arrangements also can be employed.

Column 160 contains a suitable packing material 162. Examples include but are not limited to marbles, pellets, granules, flakes, powders and so forth. The packing material can be made of natural or synthetic materials. Examples include glass, plastics, mineral rocks and many others. Regular, e.g., spherical, cylindrical, soccer ball, etc., as well as irregular shapes can be used. The packing material can have a specific color, can be transparent, translucent or opaque, and can be provided throughout the entire column or in discrete sections. The bed can include more than one material or the same type of material having one or more different shapes, colors, etc. These can be mixed evenly throughout the bed or can be provided in distinct regions of the column. In one implementation, the bed is packed with spherical marbles having a diameter within the range of from about ⅛ to about ¼ of an inch. In another implementation, the packing material is illuminated by LED lighting. Column 160 can be made from a material suitable for allowing one to view the contents of the column, e.g., packing material 162, the movement of the purifying solution through the column, possible turbulence caused by the countercurrent flow of air and purifying solution, colors, lighting, etc. In one example, packed column 160 is made of glass or a transparent or translucent plastic.

In addition to esthetic effects, the packing material can be selected or prepared to facilitate or enhance the purification techniques described herein. For example, the packing material can have characteristics such as particle size, packing density or other properties that promote a desired flow rate or contact time between the air being purified and the purifying solution. Small particle sizes or mixtures of smaller and larger particles can result in a more densely packed bed, potentially slowing down flow rates through the bed. In some embodiments, the packing material can contain or provide additives such as, for instance, those described above, e.g., antimicrobial agents, for instance, silver nanoparticles. In others, the packing material can consist, consist essentially of or can comprise sorbents that absorb and/or adsorb one or more impurities, e.g., VOCs, found in the incoming air.

More than one packed bed can be utilized. For example, a second packed bed or column (not shown in FIG. 2) can be added downstream of packed column 160. The packing material for this additional bed can be selected to remove water-based aerosols from the air emerging from packed column 160, preferably before it reaches cooling device 122, or for other purposes, e.g., esthetics, added purification capacity, controlling operation parameters, and so forth. The system can be designed to allow the option of operating all or only some of the packed beds provided, as desired or needed.

Generally, cooling device 122 serves to condense any entrained VOC vapors and, optionally, water vapors that might damage or clog downstream filters, by lowering the temperature of the air stream emerging from the packed bed(s) (also referred to herein as "outgoing air" stream). In one non-limiting example, device 122 includes one or more cooling plates 124.

From cooling device 122, the outgoing air stream passes through optional filter 32, e.g., a HEPA or another suitable filter such as described above, to remove any entrained particulates and generate purified air exhaust, represented by arrows M, that exists the system at outlet 136 (arrows N). If no filter for removing particulates is employed, the outgoing air stream exits the system as a purified air exhaust.

In many implementations, the purified air exhaust is humidified, e.g., prior to leaving system 110, using, for example, pump/atomizer arrangement 142. If used, arrangement 142 is supplied with humidifying solution from reservoir 118 via draw tube 144. Alternatively or in addition to, water can be vaporized using plate 132.

Packed bed 160 also can receive additives such as, for example, those described above, e.g., complexing agents, micellar materials, surfactants, soaps, antimicrobials, or any combination thereof. The additives can be present in a solution (the term, as used herein, embracing true solutions as well as multiphase systems such as emulsions, dispersions, colloidal suspensions, and the like) held in auxiliary reservoir 166, from where they can be delivered, e.g., continuously or intermittently to a suitable location of the packed column 160, for instance, at its top end. The amount, rate, timing and/or other parameters characterizing the delivery of additives to packed bed 160 can be adjusted by metering pump 168.

As with apparatus 10, apparatus 110 can be provided with components such as, for instance, sensors, valves, controls, interfaces, software, auxiliary reservoirs, diagnostics, integration with other functions and so forth, such as those described above, for example. The system can be operated manually, in semi-automated or in fully automated fashion. In specific embodiments, apparatus 110 is designed to operate with little or no human involvement.

Reservoirs 116 and 118, packing column 160 and other components described above can be enclosed in housing 170. In specific implementations, the housing materials used are selected to allow viewing the packing column and or packing materials 162. Glass, plastics, metals, combinations of materials are just a few illustrative examples.

A system such as that shown in FIG. 1 or 2 can be coupled with an apparatus for testing or monitoring the quality of the ambient air in the indoor environment. A suitable apparatus can be custom designed unit or can be a commercial unit, (e.g., such as one available from Prism Analytical Technologies, Inc. Mount Pleasant or from other suppliers. Based on data supplied by the ambient air testing unit, the air purification system described herein can be automatically started, shut down or can have its rate of operation adjusted (increased or decreased) as needed to provide good ambient air quality.

The following non-limiting examples are provided to illustrate principles of the invention.

Example 1

In one example, ambient air having a 0.2 parts per million (ppm) formaldehyde level was bubbled through water (with no additives) at high flow rates using a laboratory based impinger similar to impingers utilized in applicable EPA air testing procedures.

The air leaving the impinger was then analyzed by a fluorimeter configured to measure sub parts per billion (ppb) levels of formaldehyde. The purified air was found to contain approximately 10 ppb of formaldehyde. This represents a 95% reduction of the formaldehyde concentration, a significant improvement over existing commercial technologies for purifying indoor air.

From tests, it is known that the average formaldehyde home level is in the 50 ppb range and varies widely. Considering a 95% recovery efficiency (as shown above), product air would be generated at 2.5 ppb, 8 times lower than the NIOSH recommended limit for indoor air and 300 times lower than the OSHA limit.

This or a similar approach is expected to also remove other polar molecules such as alcohols, aldehydes, ketones, acids, bases ($NH_3$), NOx and SOx more effectively than current carbon or solid extraction based materials.

Example 2

To further investigate the viability of a device such as system 10 described above, we performed the following, more challenging test. Two mixed standards were passed through the device. In one case, approximately 36% of 17 mold VOCs (heavier weight alcohols that can be associated with the presence of mold in the air) were retained in a single pass through a purifying solution consisting of only water. In another case, approximately 62% of 24 chlorinated VOCs were retained in a single pass through such a solution.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for purifying indoor air, the method comprising:
   contacting an incoming air stream from an indoor environment with a purifying solution to retain one or more gaseous, vapor or particulate pollutants in the purifying solution and produce an outgoing air stream, wherein the contact between the incoming air stream and the purifying solution is conducted by:
      directing the incoming air stream to a purifying solution reservoir and through the purifying solution held in the purifying solution reservoir, or
      directing the incoming air stream to and through a packed column, and directing purifying solution from the purifying solution reservoir to and through the packed column;
   cooling or maintaining the incoming air stream from the indoor environment, the purifying solution reservoir, the outgoing air stream or any combination thereof to or at a temperature at which the vapor pollutants are in a liquid phase;
   optionally directing the outgoing air stream through a filter for removing particulates; and
   releasing to the indoor environment a purified air exhaust, wherein the purified air exhaust is dehumidified or humidified.

2. The method of claim 1, wherein the air exhaust is dehumidified by retaining water vapors present in the incoming air stream in the purifying solution.

3. The method of claim 1, wherein the purified air exhaust is humidified by adding water vapors to the purified air exhaust before or as it is released to the indoor environment.

4. The method of claim 3, wherein water vapors are added by vaporizing a humidifying solution.

5. The method of claim 1, wherein entrained vapor pollutants, water vapors or both vapor pollutants and water vapors are condensed by contacting the outgoing air stream with a condensation device.

6. The method of claim 1, wherein the purifying solution comprises water and, optionally, an additive selected from the group consisting of a complexing agent, an oxidizing agent, a micellar material, a surfactant, a soap, an antimicrobial agent, and any combination thereof.

7. The method of claim 1, wherein the air stream from the indoor environment, the outgoing air stream, or both are passed through one or more condensers cooled by a Peltier device.

8. The method of claim 1, further comprising adding or removing purifying solution to or from a reservoir containing it, supplying one or more additives to the purifying solution, or both.

9. The method of claim 1, wherein the method is conducted continuously.

10. The method of claim 1, further comprising testing the quality of ambient air in the indoor environment.

11. The method of claim 1, wherein
   contacting the incoming air with the purifying solution is conducted in a packed column and, further comprising, lighting the packed column with LED lighting.

12. The method of claim 1, further comprising removing particulates in the incoming air with a filter.

13. The method of claim 6, further comprising containing the additive in an auxiliary reservoir.

14. A method for purifying indoor air, the method comprising:
   contacting an incoming air stream from an indoor environment with a purifying solution to retain one or more pollutants in the purifying solution and produce an outgoing air stream;
   cooling the incoming air stream and/or a purifying solution reservoir at a temperature at which vapor pollutants are in a liquid phase; and
   dehumidifying the outgoing air stream,
      wherein the contact between the incoming air stream and the purifying solution is conducted by:
         directing the incoming air stream through the purifying solution,
      wherein the purifying solution is held in the purifying solution reservoir, or
         directing the incoming air stream to and through a packed column, and directing purifying solution from the purifying solution reservoir to and through the packed column.

15. The method of claim 14, wherein the purifying solution comprises water and an antimicrobial agent.

16. The method of claim 14, wherein the air stream from the indoor environment is passed through one or more condensers cooled by a Peltier device.

17. The method of claim 14, further comprising testing the quality of ambient air in the indoor environment.

18. The method of claim 14, further comprising passing the outgoing air through a condensing coil.

19. The method of claim 1, wherein the contact between the incoming air stream and the purifying solution is conducted by directing the incoming air stream through the purifying solution, and wherein the incoming air stream is mixed with the purifying solution by using a bubbler or a sparger.

20. The method of claim 1, wherein the contact between the incoming air stream and the purifying solution is conducted by directing the incoming air stream to and through a packed column, and wherein the incoming air stream and the purifying solution are passed through the packed column in a countercurrent flow pattern.

21. The method of claim 14, wherein the contact between the incoming air stream and the purifying solution is conducted by directing the incoming air stream through the purifying solution, wherein the purifying solution is held in the purifying solution reservoir, and wherein the incoming air stream is mixed with the purifying solution by using a bubbler or a sparger.

22. The method of claim 14, wherein the contact between the incoming air stream and the purifying solution is conducted by directing the incoming air stream to and through a packed column, and directing purifying solution from the purifying solution reservoir to and through the packed column, and wherein the incoming air stream and the purifying solution are passed through the packed column in a countercurrent flow pattern.

\* \* \* \* \*